(12) United States Patent
Song et al.

(10) Patent No.: US 10,768,614 B2
(45) Date of Patent: Sep. 8, 2020

(54) ROBOT SPEECH CONTROL SYSTEM AND METHOD THEREOF

(71) Applicant: NATIONAL CHIAO TUNG UNIVERSITY, Hsinchu (TW)

(72) Inventors: Kai-Tai Song, New Taipei (TW); Yao-Hsang Chen, Tainan (TW)

(73) Assignee: National Chiao Tung University, Hsinchu (TW)

(*) Notice: Subject to any disclaimer, the term of this patent is extended or adjusted under 35 U.S.C. 154(b) by 321 days.

(21) Appl. No.: 15/904,435

(22) Filed: Feb. 26, 2018

(65) Prior Publication Data
US 2019/0107833 A1    Apr. 11, 2019

(30) Foreign Application Priority Data
Oct. 5, 2017   (TW) .............................. 106134301 A (51) Int. Cl.
| | |
|---|---|
| G05B 19/18 | (2006.01) |
| G05D 1/00 | (2006.01) |
| G10L 15/22 | (2006.01) |
| G05D 1/02 | (2020.01) |
| G06F 3/16 | (2006.01) |

(52) U.S. Cl.
CPC ......... *G05D 1/0016* (2013.01); *G05D 1/0022* (2013.01); *G05D 1/024* (2013.01); *G05D 1/0246* (2013.01); *G06F 3/167* (2013.01); *G10L 15/22* (2013.01); *G05D 2201/0217* (2013.01);
(Continued)

(58) Field of Classification Search
CPC .... G05D 1/0016; G05D 1/0022; G05D 1/024; G05D 1/0246; G05D 2201/0217; G06F 3/167; G10L 15/22; G10L 2015/223; Y10S 901/47; Y10S 901/01; Y10S 901/09;
(Continued)

(56) References Cited

U.S. PATENT DOCUMENTS

| | | | |
|---|---|---|---|
| 2016/0379121 A1* | 12/2016 | Ge | B25J 11/0005 706/46 |
| 2018/0304471 A1* | 10/2018 | Tokuchi | B25J 11/0015 |

OTHER PUBLICATIONS

"Online Modulation of the Level of Assistance in Shared Control Systems" by Tom Carlson, Robert Leeb, Ricardo Chavarriaga and Jos'e del R. Mill'an; 2012 IEEE International Conference on Systems, Man, and Cybernetics; Oct. 14-17, 2012, COEX, Seoul, Korea (Year: 2012).*

* cited by examiner

*Primary Examiner* — Harry Y Oh
*Assistant Examiner* — Sohana Tanju Khayer
(74) *Attorney, Agent, or Firm* — Wang Law Firm, Inc.

(57) ABSTRACT

The present disclosure illustrates a robot speech control system including a robot body, a handheld device, a command receiver, an ambient sensor, a processor and a controller. The handheld device includes a display interface and a speech input interface, and the speech input interface is configured to input a speech command which is then converted, by a speech recognition program, into a speech control instruction. An auto-dodge program converts the information into an auto-dodge instruction. The processor receives the speech control instruction and the information associated with the environment, and use Bayesian regression algorithm to calculate a free space probability, so as to obtain weights of a speech command and a dodge command. The processor integrates the speech control instruction and the weight of the speech command, and the auto-dodge
(Continued)

instruction and the weight of the dodge command, to generate a movement control instruction.

14 Claims, 7 Drawing Sheets

(52) U.S. Cl.
CPC ....... *G10L 2015/223* (2013.01); *Y10S 901/01* (2013.01); *Y10S 901/09* (2013.01); *Y10S 901/47* (2013.01)

(58) Field of Classification Search
CPC ........ B25J 5/007; B25J 9/1602; B25J 9/1666; B25J 13/003
See application file for complete search history.

ROBOT SPEECH CONTROL SYSTEM AND METHOD THEREOF

CROSS-REFERENCE TO RELATED APPLICATION

This application claims the benefit of Taiwan Patent Application No. 106134301, filed on Oct. 5, 2017, in the Taiwan Intellectual Property Office, the disclosure of which is incorporated herein in its entirety by reference.

BACKGROUND OF THE INVENTION

1. Field of the Invention

The present disclosure relates to a robot speech control system and method thereof, more particularly to a robot control system in which the robot can be controlled by an operator's speech command and the robot is also integrated with an auto-dodge function, so that the robot is able to determine an optimal execution instruction in complicated environment, and a method thereof.

2. Description of the Related Art

The conventional robot can perform preset actions, or can be controlled by various instructions inputted from control program, and upon receiving of control instruction, the robot can execute the inputted instruction to move or perform corresponding action. For example, the robot can be a household robot or nursing robot. In order to control the conventional robot to move a particular location, an operator must input a moving instruction through an operation interface of the remote control device, or press a button of the robot to control the robot to execute the specific action; for this reason, the operator must spend a lot of time to learn how to control the conventional robot, but the complicated operation flow of the conventional robot is inconvenient for the operator and it also decreases the user's intention to operate the robot.

In order to solve aforementioned problems, the manner of using a speech command to control the robot is developed and becomes an important manner of controlling the robot. The operator can naturally use the speech command to communicate with the robot, for example, the professional or the general public can intuitionally use speech command to input the operating instruction to directly control the robot. However, when the operator uses speech to control the robot, a time delay may occur during speech recognition and information transmission, so that the robot is hard to respond the speech command in real time. Furthermore, in complicated environment, the robot is affected easily by obstacles at periphery thereof, so the intention of the user's speech command cannot be performed easily.

Therefore, what is needed is to develop a robot speech control system and method to enable the robot to safely execute the inputted command, so as to make the robot to be controlled more conveniently and human-friendly.

SUMMARY OF THE INVENTION

In order to solve above-mentioned problems, the present disclosure is to provide a robot speech control system and a method thereof, to enable the robot to optimally execute the speech command and the autonomous control instruction, so that the robot can respond to the information associated with environment and the user's speech command, thereby solving the conventional technology problem of speech delay and lower environmental safety.

According to an embodiment, the present disclosure provides a robot speech control system including a robot body, a handheld device, a command receiver, an ambient sensor, a processor and a controller. The robot body includes a movable device including a plurality of turning wheels configured to control the robot body to turn or move. The handheld device includes a display interface and a speech input interface, and the speech input interface is configured to input a speech command which is then converted, by a speech recognition program, into a speech control instruction. The command receiver is disposed in the robot body and electrically connected to the handheld device through a wireless transmission manner, to receive the speech control command. The ambient sensor is disposed on the robot body and configured to detect information associated with environment around the robot body, wherein an auto-dodge program converts the information into an auto-dodge instruction. The processor is electrically connected to the command receiver and the ambient sensor, and configured to receive the speech control instruction and the information associated with the environment, and use Bayesian regression algorithm to calculate a free space probability, so as to obtain weights of a speech command and a dodge command. The processor integrates the speech control instruction and the weight of the speech command, and the auto-dodge instruction and the weight of the dodge command, to generate a movement control instruction. The controller is electrically connected to the processor and the movable device, and receives the movement control instruction to drive the movable device.

Preferably, the handheld device comprises a smartphone, a tablet computer or a notebook computer, and the wireless transmission manner comprises a manner of using Wi-Fi or wireless communication network.

Preferably, the ambient sensor comprises a laser scanner configured to measure a distance between the robot body and an obstacle.

Preferably, the ambient sensor is configured to divide the information associated with the environment into a plurality of moving spaces, and the plurality of moving spaces are served as prior probabilities to obtain posterior probabilities of the plurality of moving spaces based on Bayesian regression algorithm, and a maximum of the plurality of posterior probabilities is selected as the free space probability.

Preferably, the plurality of moving spaces comprises a left front space, a front space and a right front space, and the left front space is in a range of angle from a left horizontal line of the robot body to 75 degrees forward, the front space is in a range of angle from 15 degrees left to 15 degrees right, and the right front space is in a range of angle from a right horizontal line of the robot body to 75 degrees forward.

Preferably, the robot speech control system includes a comparator electrically connected to the processor and configured to compare whether the speech control instruction is equal to a free space instruction corresponding to the free space probability, and the comparator outputs the speech control instruction as an output instruction when the speech control instruction is equal to the free space instruction, and the comparator outputs the free space instruction as the output instruction when the speech control instruction is not equal to the free space instruction.

Preferably, the robot speech control system includes a camera disposed on the robot body and configured to capture a vision image, and a self-positioning mark of the robot body is displayed on an environment map, and the vision image is transmitted to the handheld device through the wireless transmission manner, for display on the display interface.

According to an embodiment, the present disclosure provides a robot speech control method which is applicable to control a robot body to move or turn. The robot body includes a command receiver, an ambient sensor, a processor, a controller and a movable device. The robot speech control method includes following steps: inputting, through a speech input interface of a handheld device, a speech command, and using a speech recognition program to convert the speech command into a speech control instruction; transmitting the speech control instruction to a command receiver through a wireless transmission manner; using an ambient sensor to detect information associated with environment around the robot body, and using an auto-dodge program to convert the information into an auto-dodge instruction; using the processor to receive the speech control instruction and the information associated with environment, and using Bayesian regression algorithm to calculate a free space probability to obtain a weight of speech command and a weight of dodge command; using the processor to integrate the speech control instruction, the weight of speech command, the auto-dodge instruction and the weight of dodge command, to obtain a movement control instruction; and transmitting the movement control instruction to the controller, and using the controller to drive the movable device to turn or move the robot body.

Preferably, the handheld device comprises a smartphone, a tablet computer or a notebook computer, and the wireless transmission manner comprises a manner of using Wi-Fi or wireless communication network.

Preferably, the ambient sensor uses a laser scanner to measure a distance between the robot body and an obstacle.

Preferably, the ambient sensor is configured to divide the information associated with the environment into a plurality of moving spaces, and the plurality of moving spaces are served as prior probabilities to obtain posterior probabilities of the plurality of moving spaces based on Bayesian regression algorithm, and a maximum of the plurality of posterior probabilities is selected as the free space probability.

Preferably, the plurality of moving spaces comprises a left front space, a front space and a right front space, and the left front space is in a range of angle from a left horizontal line of the robot body to 75 degrees forward, the front space is in a range of angle from 15 degrees left to 15 degrees right in front of the robot body, and the right front space is in a range of angle from a right horizontal line of the robot body to 75 degrees forward.

Preferably, the robot speech control method includes a step of using a comparator to compare whether the speech control instruction is equal to a free space instruction corresponding to the free space probability, wherein the comparator outputs the speech control instruction as an output instruction when the speech control instruction is equal to the free space instruction, and the comparator outputs the free space instruction as the output instruction when the speech control instruction is not equal to the free space instruction.

Preferably, the robot speech control method includes a step of using a camera to capture a vision image, and displaying a self-positioning mark of the robot body on an environment map, and transmitting the vision image to the handheld device through the wireless transmission manner, for display on the display interface.

According to above-mentioned content, the robot speech control system and method of the present disclosure can have at least one of the following advantages.

First, the robot speech control system and the method thereof can allow the operator to naturally and intuitionally use the speech command to control the robot without spending a lot of time for operation training, so that the complicated control procedure of the robot is simplified effectively.

Secondly, the robot speech control system and the method thereof can obtain the optimal control instruction according to weights of the user intention and the robot auto-dodge intention, so that the operator can efficiently and safely control the robot without inputting excessive speech commands.

Thirdly, the robot speech control system and the method thereof can transmit the speech signal through the wireless network, and the camera returns the real-time image of the robot and establish the environment map and the self-positioning mark of the robot, so that the user can remotely control the robot in real time and more conveniently.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items. The following refers to FIG. 1, which is a block diagram of a robot speech control system of an embodiment of the present disclosure. The robot speech control system includes a robot body 10 and a handheld device 20. The robot body 10 includes a command receiver 101, an ambient sensor 102, a processor 103, a controller 104 and a movable device 105. The handheld device 20 includes a speech input interface 201 and a display interface 202. In practice application, the robot body 10 can be a household robot (such as a sweeper robot) or a healthcare device (such as a healthcare robot or an electronic wheelchair). The robot body 10 includes a movable device 105, so that the robot body 10 can be controlled by a user to move to a particular location. The movable device 105 includes a base plate or a platform configured to carry the robot, motors, and turning wheels driven by the motor.

Figure 1:
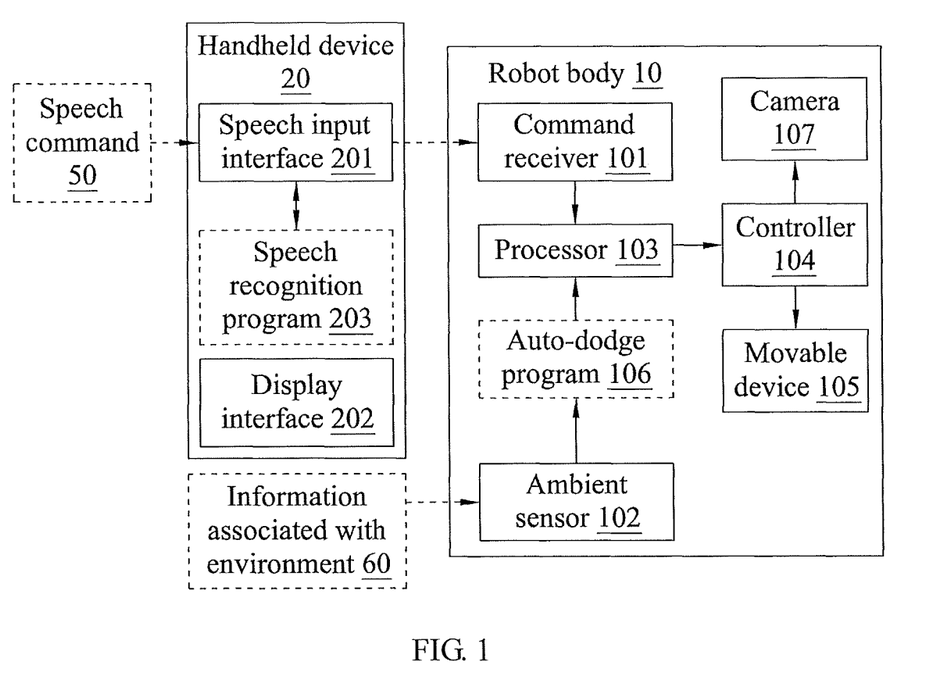
FIG. 1 is a block diagram of a robot speech control system of an embodiment of the present disclosure.

After being powered on, the conventional robot is able to execute preset actions only, or execute actions according to instructions only from a remote control device. For this reason, the conventional robot can be controlled to execute actions, for example, to move to the particular location, by manual manner or setting the preset program only. According to this embodiment of the present disclosure, the user can generate the control instruction through the handheld device 20; more particularly, the user can intuitively speak to generate a speech command 50, so as to control movement or action of the robot body 10 in real time. Preferably, the handheld device 20 can be a smartphone, a tablet computer or a notebook computer. The handheld device 20 is provided with the speech input interface 201 configured to receive and recognize the speech command 50. Preferably, the speech input interface 201 can include a microphone. After a sound receiving device (such as the microphone) receives the speech command 50 spoken by the user, a speech recognition program 203 (such as CMU Sphinx speech recognition system) installed in the handheld device 20 can recognize the speech command 50, and then convert the speech command 50 into at least one speech control instruction. The speech control instructions can be transmitted to the command receiver 101 of the robot body 10 through Wi-Fi, Bluetooth or wireless communication network.

Furthermore, the robot can be equipped with various autonomous action functions, such as a function of automatically dodging an obstacle. The robot body 10 can include an ambient sensor 102 disposed thereon. When the ambient sensor 102 detects the obstacle around the robot body 10 in the environment during movement of the robot body 10, an auto-dodge program 106 of the robot body 10 can convert the detected information 60 associated with environment into an auto-dodge instruction. The purpose of auto-dodge is to prevent the robot body 10 from being damaged or/and damaging other objects in the environment because of falling down or colliding with other objects during movement. The command receiver 101 and the ambient sensor 102 are electrically connected to the processor 103, and configured to transmit the speech control instruction and the auto-dodge instruction to the processor 103. In this embodiment, the processor 103 includes a central processing unit or a micro-processor, and is configured to execute a computation program, such as Bayesian regression algorithm, to calculate free space probability of the robot body 10, thereby obtaining a weight of speech command and a weight of dodge command. Next, the processor 103 determines the to-be-executed movement control instruction in consideration of the speech control instruction, the weight of speech command, the auto-dodge instruction, and the weight of dodge command. The way of calculating the free space probability and the weights are described in detail in following embodiments. After the movement control instruction is determined, the processor 103 transmits the movement control instruction to the controller 104. Preferably, the controller 104 can be a control chip integrated in an integrated circuit. The controller 104 receives the control signal from the processor 103, to control the motor and the turning wheel of the movable device 105 according to the control signal, so as to drive the robot body 10 to move to the position corresponding to the control signal.

Furthermore, the robot body 10 can include the camera 107 mounted thereon and configured to capture a vision image during movement. The vision image can be transmitted to the handheld device 20 in real time through Wi-Fi or wireless communication network, and the display interface 202 displays the vision image for the user to know the real-time image-based information. By using the camera 107, the user can input various movement instructions according to the image shown on the screen of the smartphone, so that the user can confirm a relative position of the robot or remote control the robot easily.

Figure 2:
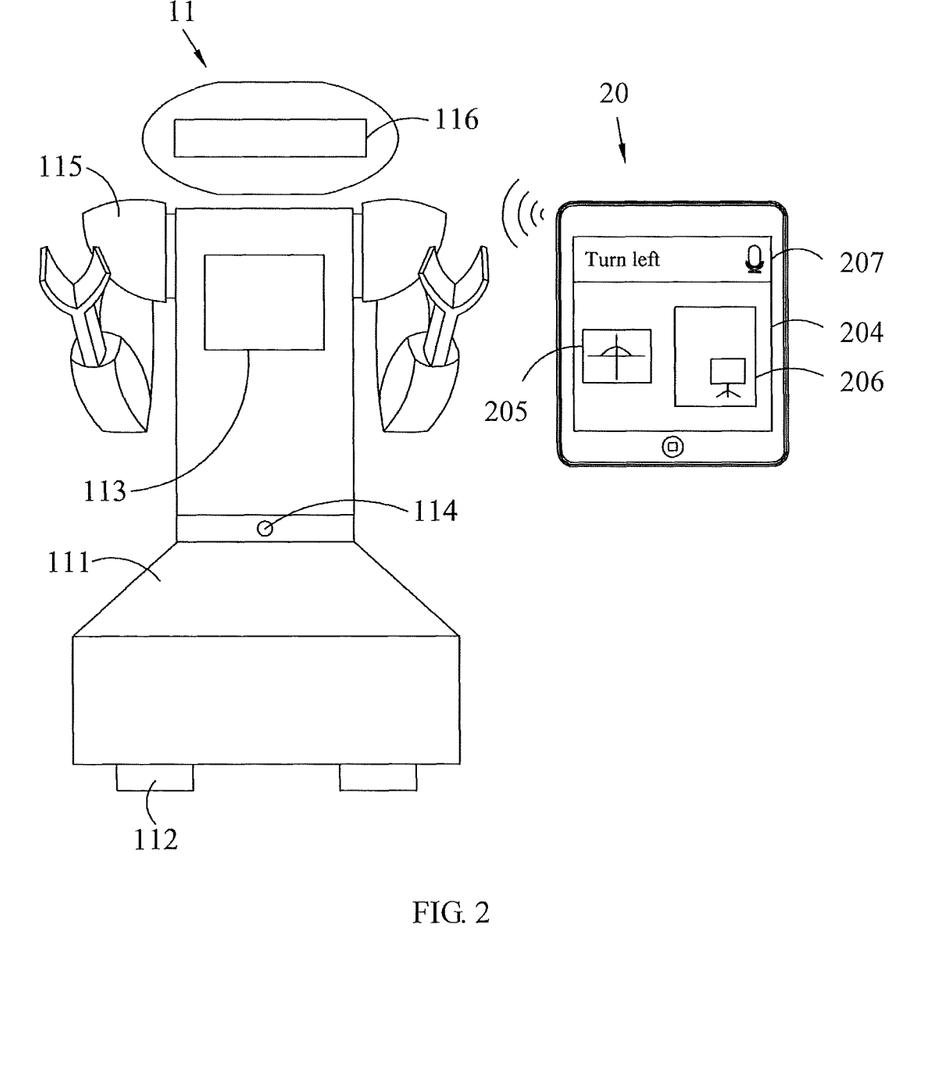
FIG. 2 is a schematic view of a robot body and a handheld device of the embodiment of the present disclosure.

The following refers to FIG. 2. FIG. 2 is a schematic view of a robot body and a handheld device of an embodiment of the present disclosure. As shown in FIG. 2, the robot speech control system may include a robot body 11 and a handheld device 20. In this embodiment, the robot body 11 includes a movable platform 111 and turning wheels 112 which correspond to the movable device 105 of FIG. 1. The robot body 11 also includes a touch screen 113 and a laser scanner 114. The touch screen 113 can serve as an operation interface of the robot body 11, and can also serve as the display screen showing an operational state of the robot body 11. The laser scanner 114 is an embodiment of the ambient sensor 102 of FIG. 1, and configured to sense the environment around the robot body 11 and measure a distance between the robot body 11 and the obstacle; however, the present disclosure not limited to this example. In other embodiments, the ambient sensor 102 can be an ultrasonic scanner or an infrared sensor or a laser scanner. The robot body 11 includes two robot arms 115 which each can have different function upon demand. For example, the robot arm can have six degrees of freedom (DOF) and be controlled by the controller to perform multi-axis rotation. The camera 116 can be mounted at the front end of a head part of the robot, to capture the image in front of the robot in real time.

The handheld device 20 of this embodiment can be a tablet computer, and the display screen 204 can show a plurality of windows. The information associated with environment sensed by the laser scanner 114 and the real-time image captured by the camera 116 can be transmitted to the handheld device 20 through wireless network and displayed on an environmental map information window 205 and a real-time image window 206. According to the real-time image captured by the camera 116, the user can view the environment in front of the robot body 11, and the information associated with environment can be in cooperation with a pre-built environment map and the current location of the robot body 11, to perform self-positioning function, so as to assist in determining an ambient environmental state. When the microphone of the handheld device 20 receives the speech command, the display screen 204 can also control the window 207 to display a speech recognition result, so as to confirm whether the recognition for the speech command is correct. When the speed recognition is confirmed, the speech command is transmitted to the robot body 11 for control.

Figure 3:
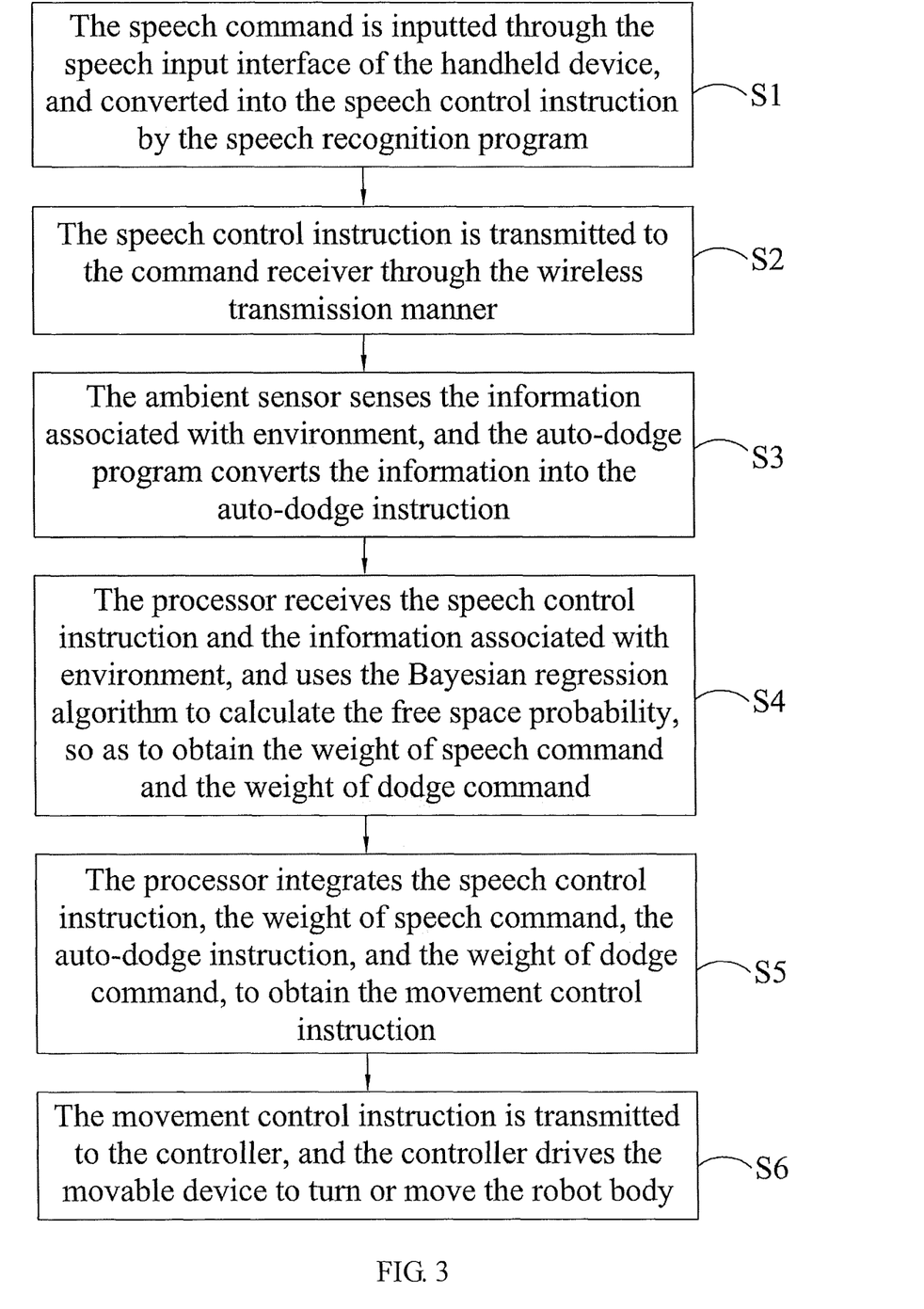
FIG. 3 is a flowchart showing the steps in an operation of a robot speech control method of an embodiment of the present disclosure.

The following refers to FIG. 3, which is a flowchart showing the steps in an operation of a robot speech control method of an embodiment of the present disclosure. As shown in FIG. 3, the robot speech control method includes following steps S1 through S6.

In the step S1, the speech command is inputted through the speech input interface of the handheld device, and converted into the speech control instruction by the speech recognition program. In this embodiment, the speech command can be classified into "Go" command, "Turn" command, and "Move" command which are used to control a speed, a turning angle and an angular velocity of the robot, respectively. After the speech command recognition, the action of the robot can be controlled by these three speech commands. The "Go" command is used to change a linear speed of the robot, in other words, the robot is moved forwardly or backwardly with a fixed moving angle. The "Turn" command is used to change the turning angle and the angular velocity of the robot, in other words, the robot is turned with the turning angle. The "Move" command is used to change the moving angle of the robot without changing the linear speed and the angular velocity; that is, the "Move" command is used to correct an error of the movement path of the robot without changing an orientation angle.

In the step S2, the speech control instruction is transmitted to the command receiver through the wireless transmission manner. After the speech control instruction is generated by the recognition program, the speech control instruction can be transmitted to the command receiver of the robot body through wireless transmission manner such as Wi-Fi, Bluetooth or wireless communication network. The command receiver may include a storage device, such as temporary storage memory, configured to the received voice command but not executed yet.

In the step S3, the ambient sensor senses the information associated with environment, and the auto-dodge program converts the information into the auto-dodge instruction. The auto-dodge function is to enable the robot to dodge unknown obstacle in the environment. In this embodiment, the manner of dodging obstacle is designed upon omnidirectional movement. When the robot is moved in any direction, a magnitude and a direction of the speed of the robot can be expressed as a vector in a space. When the robot moves close to the obstacle, the auto-dodge program generates the auto-dodge instruction to control the robot to move in a direction opposite to the obstacle. The dodge speed vector $U_o$ can be expressed as:

$$U_o = a \sum_i \left[ \left( \frac{D_{max} - |x_i|}{D_{max}} \right) \left( \frac{-x_i}{|x_i|} \right) \right]$$

wherein $\alpha$ is a constant, $x_i$ is a vector location of the ith obstacle in a robot coordinate system, and $D_{max}$ is a maximum safe distance for the robot to dodge the obstacle. The laser scanner can be used to scan the space in range of 180 degrees front, to calculate location vectors of minimal obstacle distances in the spatial ranges in the space. When there are obstacles around the robot, the dodge speed vector $U_o$ is calculated by adding location vectors of the obstacles. In order to prevent the robot from colliding with the obstacle, when the robot has a speed vector $U_r$ towards the obstacle and the dodge speed vector is $U_o$, the robot moves according to a sum $U_c$ of the speed vector $U_r$ and the dodge speed vector $U_o$, and the speed vector $U_c$ is expressed as:

$$U_c = U_o + U_r$$

The dodge speed vector $U_o$ includes linear speeds of the robot in X direction and Y direction, but does not include the angular velocity of the robot. For this reason, the robot can dodge the obstacle without changing the orientation thereof.

In the step S4, the processor receives the speech control instruction and the information associated with environment, and uses the Bayesian regression algorithm to calculate the free space probability, so as to obtain the weight of speech command and the weight of dodge command. The Bayesian regression algorithm has an advantage of using the characteristic parameters associated with the environment as the prior probability, and combine the environmental parameters, which is obtained by using appropriate mathematical formula, with the experienced information, together. The prior probability can be generated in consideration of general theory, or previous experience. According to Bayesian theorem, a density function of a posterior probability of the desired result can be calculated based on the prior probabilities. In this embodiment, the probability distribution of the free space can be obtained according to the posterior probability.

Figure 4:
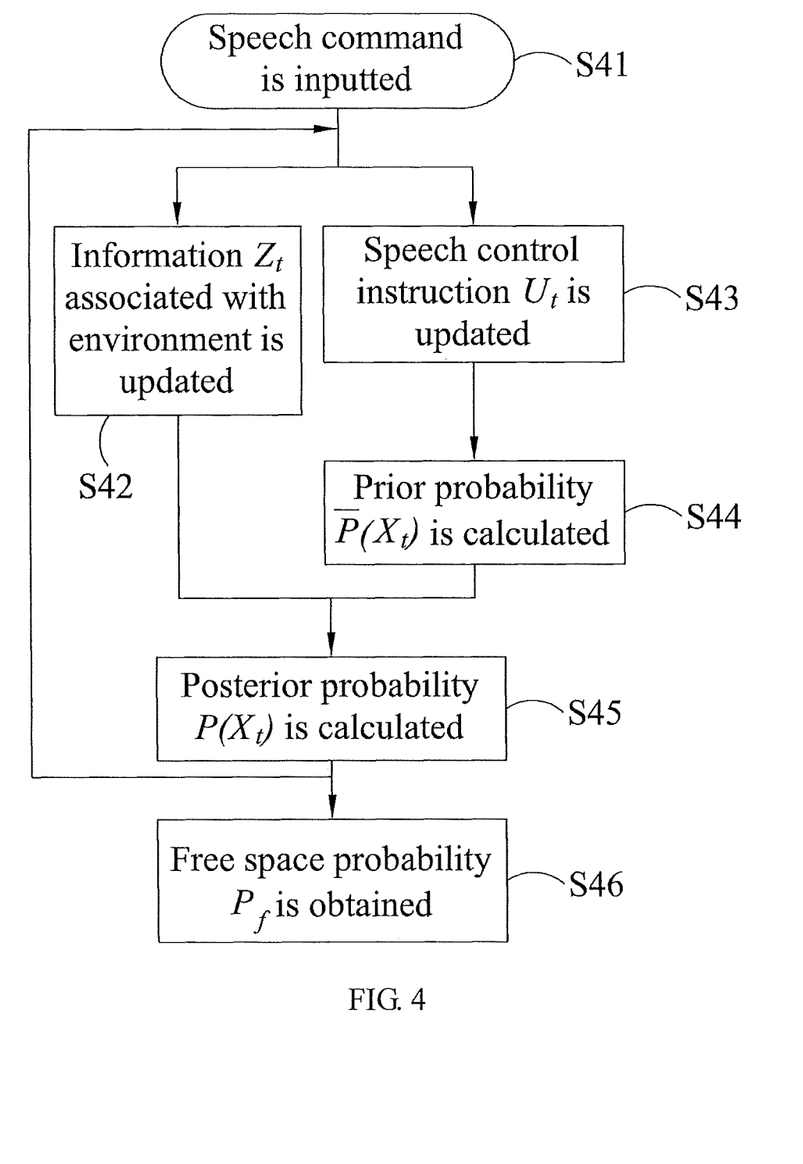
FIG. 4 is a flowchart showing the steps in an operation of Bayesian regression algorithm of an embodiment of the present disclosure.
Figure 5:
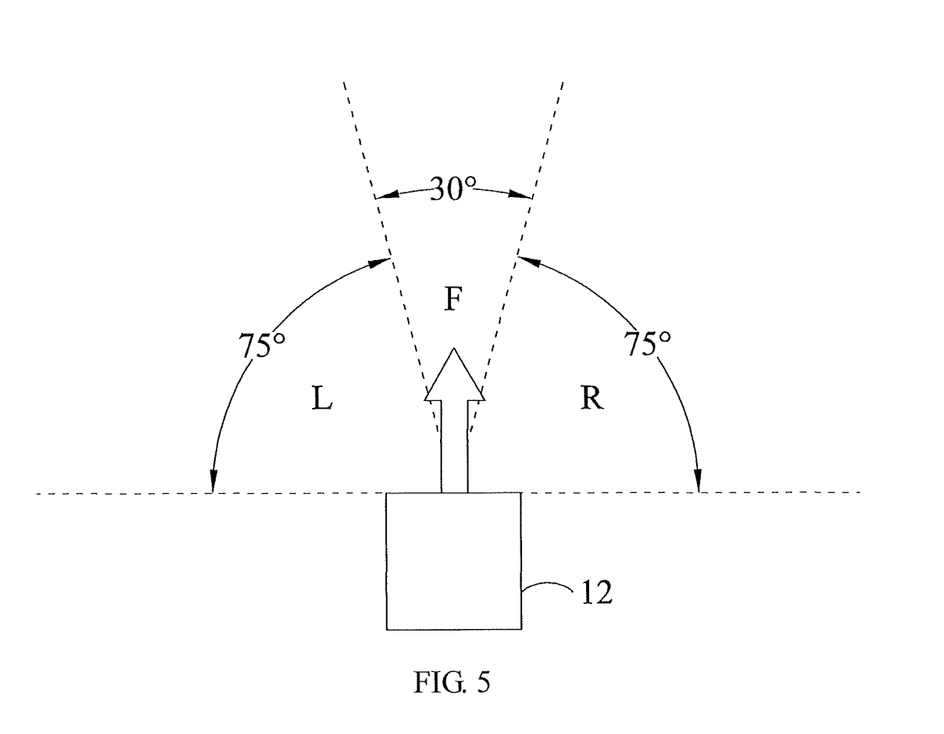
FIG. 5 is a schematic view of moving spaces of an embodiment of the present disclosure.

The following refers to FIGS. 4 and 5. FIG. 4 is a flowchart showing the steps in an operation of Bayesian regression algorithm of an embodiment of the present disclosure, and FIG. 5 is a schematic view of a moving space of an embodiment of the present disclosure. The Bayesian regression algorithm include following steps S41 through S46.

In the step S41, the speech command is inputted. After the speech command is inputted into the handheld device, the speech recognition program converts the speech command into the speech control instruction. Upon receipt of the speech control instruction, the step S42 and the step S43 are executed at the same time.

In the step S42, the information $Z_t$ associated with environment is updated. The laser scanner senses the environment to generate the information $Z_t$. The environment scanned by the laser can be divided into three spaces including a left front space L, a front space F and a right front space R. As shown in FIG. 5, the left front space L is in a range of angle from a left horizontal line of the robot body 12 to 75 degrees forward, the front space F is in a range of angle from 15 degrees left to 15 degrees right in front of the robot body 12, and the right front space R is in a range of angle from a right horizontal line of the robot body 12 to 75 degrees forward. Three different control instructions including "Turn Left" instruction, "Go Forward" instruction, and "Turn Right" instruction can represent three spaces in three directions, respectively.

In the step S43, the speech control instruction $U_t$ is updated. The speech control instruction $U_t$ represents the speech control instruction inputted by the user.

In the step S44, the prior probability $\overline{P}(X_t)$ is calculated. The prior probability $\overline{P}(X_t)$ represents the prior probability under conditions of $Z_t$ and $U_t$. In this embodiment, the three spaces are the conditions for the prior probability. The prior probability $\overline{P}(X_t)$ is expressed as:

$$\overline{P}(X_t) = P(X_t | Z_{1:t-1}, U_t)$$

wherein $X_t$ represents the free spaces in the three directions, including left front space, front space, and right front space. $Z_t$ represents the information associated with environment, and $U_t$ represents the speech control instruction inputted by the user. The previous information $Z_{1:t-1}$ and previous free space are used as the conditions to obtain the most possible free space $X_t$.

In the step S45, the posterior probability $P(X_t)$ is calculated. $P(X_t)$ is the posterior probability of the free space. The information associated with environment from the beginning to the present and the user command are used to derive the posterior probability $P(X_t)$, the posterior probability $P(X_t)$ satisfies the following equation:

$$P(X_t)=P(X_t|Z_{1:t},U_{1:t})$$

The posterior probability of the free space is derived from the prior probabilities, and the prior probabilities are defined by the three divided spaces, so that the calculation result is the probabilities $P_F(X_t)$, $P_L(X_t)$, $P_R(X_t)$ for the three free spaces.

In the step S46, the free space probability $P_f$ is obtained. The posterior probability of the free space being higher indicates that the robot highly trends to move to this free space. The three posterior probabilities can be inputted into the following equation to obtain the maximum free space probability $P_f$:

$$P_f=\mathrm{argmax}(P_F(X_t),P_L(X_t),P_R(X_t))$$

Bayesian regression algorithm also can consider the conditional probability of the user command, that is, the instruction corresponding to the free space having maximum probability also includes the weight of user command. For this reason, the free space probability can serve as the weight of speech command for execution of the user command. In this embodiment, a sum of ratios of the weight $P_f$ of speech command and the weight $P_c$ of dodge command is one, so that the weight $P_c$ of dodge command is one minus the weight $P_f$ of speech command.

In the step S5, the processor integrates the speech control instruction, the weight of speech command, the auto-dodge instruction, and the weight of dodge command, to obtain the movement control instruction. In order to enable the user to speak next action of the robot anytime and to enable the robot to calculate the best timing to execute the user speech command in advance, the comparator can be used to compare the user's speech control instruction and the free space probability, so that the robot can determine the most appropriate instruction at the present by a decision flow. The comparison result may include two states; in a first state, the speech control instruction is equal to the instruction corresponding to the free space probability, the user's speech control instruction $U_t$ is directly outputted as the user's intention $U_h$. In the other state, the speech control instruction is not equal to the instruction corresponding to the free space probability, the free space instruction $U_f$ corresponding to the highest posterior probability is outputted as the user's intention $U_h$. Based on the recursive comparison flow, the robot continuously performs comparison until the robot determines the best timing to execute the user's speech command. When the speech command indicates to change the turning angle of the robot, the robot detects whether now is the best timing to execute this speech command; if no, the robot then determines the optimal instruction at the present without executing this speech command. As a result, the robot does not clear the user's intention to use the free space instruction $U_f$ as the user intention $U_h$ until the robot is turned to the angle corresponding to the speech command.

As a result, if the robot encounters the obstacle during the turn process, the robot still moves towards the direction assigned by the user after the robot dodges the obstacle. After the user intention $U_h$ is outputted, the movement control instruction $U_s$ of this embodiment is determined according to following equation:

$$U_s=P_f\times U_h+P_c\times U_c$$

wherein the movement control instruction $U_s$ is a sum of a product of the user intention $U_h$ and the ratio $P_f$, and a product of the robot auto-dodge instruction $U_c$ and the ratio $P_c$. The ratio $P_f$ represents the maximum free space probability, and the sum of the ratio of $P_f$ and the ratio $P_c$ is 1. The ratio $P_f$ being lower indicates that the weight of robot instruction becomes higher, that is, the auto-dodge intention of the robot affects the determination of the movement control instruction $U_s$ more.

In the step S6, the movement control instruction is transmitted to the controller, and the controller drives the movable device to turn or move the robot body. Upon receiving of the movement control instruction, the processor coverts the movement control instruction into the control signal and transmits the control signal to the control chip, and according to the control signal, the control chip transmits the motor drive signal or turn signal to the movable device, so as to control the robot body to turn or move.

The reason to use the Bayesian regression algorithm is that the robot is operated in complicated environment with narrow space, so the user still has to speak the speech command at correct timing even the processor of the robot is used to compute the speech command. Therefore, the robot can self-determine the timing of executing the speech command, the distribution of the weights of the user speech command and robot auto-dodge function is determined according to the conditional probabilities, so that the user's burden in the robot control can be reduced, and the untrained operator can also intuitively and naturally control the robot by a speech control manner.

Figure 6:
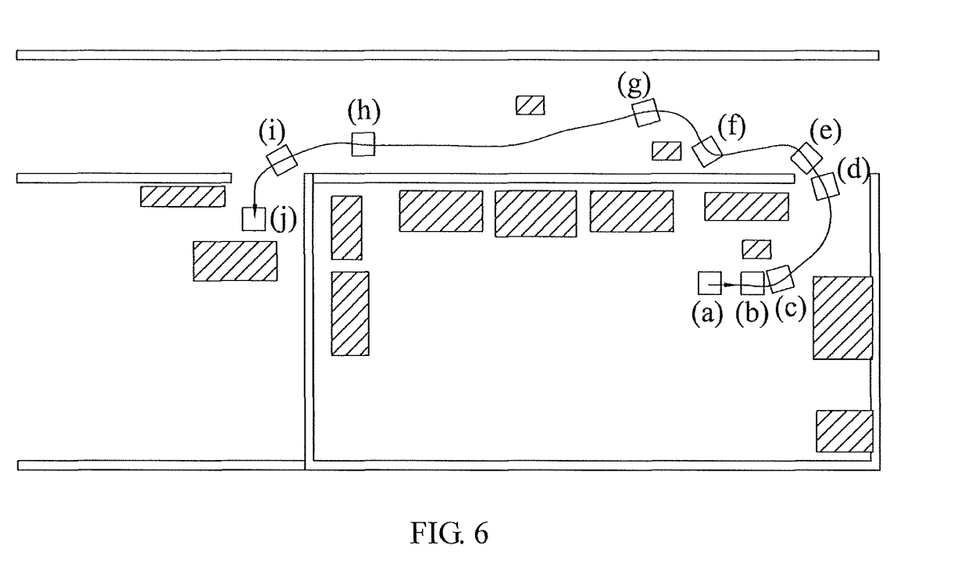
FIG. 6 is a schematic view of a trace of the robot controlled in environment, in accordance with the present disclosure.
Figure 7:
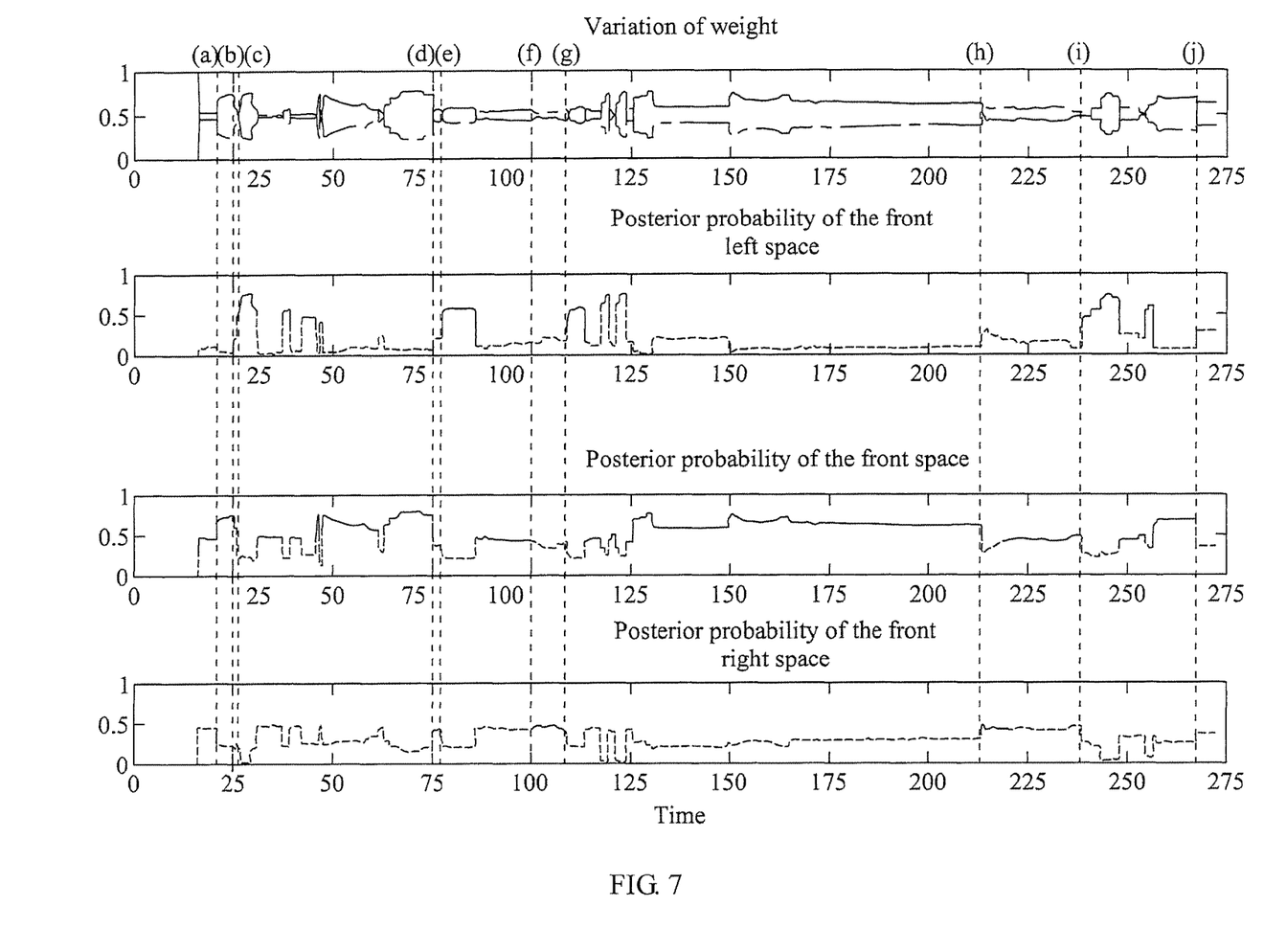
FIG. 7 is a schematic view of weight control and free space probability of the embodiment of the present disclosure.

Please refer to FIGS. 6 and 7. FIG. 6 is a schematic view of the environment where the robot moves, and a robot movement trace of an embodiment of the present disclosure. FIG. 7 is a schematic view of weight control and free space probability of an embodiment of the present disclosure. As shown in FIG. 6, the robot is activated at location point (a) in the right room, and moved to location point (j) at the left room through corridor, and FIG. 6 shows the movement trace of the robot. The points (a) through (j) shown in FIG. 7 correspond to the location point (a) through (j) shown in FIG. 6, respectively. FIG. 7 shows the posterior probabilities of the three directions to represent variation of the free space probability, and the maximum value among the posterior probabilities is used as the weight of speech command, and the variation of the weight shown in FIG. 7 is referred as the variation between the weight of speech command and the weight of dodge command of the robot. The processor of the robot calculates the movement control instruction according to the weight value, and transmits the movement control instruction to the controller, so as to drive the movable device to move or turn the robot.

The following describes the states of location points. At the location point (a), the robot is just activated and does not receive the user's speech command yet, so the probabilities of the three free spaces only respond the condition that there is an obstacle at left side in the environment, and the posterior probability of the left front space is the lowest among the three spaces. When the user speaks "Go Forward" speech command at the location point (a), the user's intention is considered into the probability calculation for the front space according to the "Go Forward" speech command, and it causes the posterior probability of the front space is increased to 0.75, so that the front space has the maximum posterior probability among the three spaces and is selected as the free space probability of the robot. Furthermore, the user command is equal to the free space instruction corresponding to the free space probability, so the robot executes the "Go Forward" speech command.

When the robot is moved close to the location point (b) and the user speaks "Turn Left" speech command, there is the obstacle at the left side, the posterior probability of the left front space is added to the user intention and increased to 0.20, but the posterior probability of the left front space is not the maximum among the three paces, so that the robot does not execute the "Turn Left" command. The posterior probability of the front space is 0.59 and is the highest value among the three free spaces, so the robot determines that now is not the best timing to execute the speech command in the present environment, and the robot executes the "Go Forward" command corresponding to the front space having the highest probability; as a result, the robot is kept moving forwardly. When the robot reaches the location point (c), there is a movable space at the left side, so the posterior probability of the left front space is up to 0.76 and becomes the maximum among the three spaces. For this reason, the robot determines that now is the best timing to execute the "Turn Left" speech command, and the robot executes the "Turn Left" speech command.

After the robot is turned left at the location point (c), the robot is gradually moved close to the obstacle at the left side, so the posterior probability of the left front space is dropped to 0.06, and the posterior probability of the front space is 0.48 and becomes the highest among the three spaces and is selected as the free space probability of the robot. As a result, the robot automatically switch, from the user's speech control instruction, to the free space instruction corresponding to the free space having the highest posterior probability, that is, the robot execute the "Go Forward" command, and the posterior probability of the front space is served as the weight of speech command. The weight of speech command is 0.48, and the weight of dodge command is 0.52, so the robot executes the dodge command having the higher weight.

After the robot is moved to the location point (d), the user views the real-time image captured by the camera to know that the robot reaches a door and then inputs "Turn Left" speech command. At the location point (d), the posterior probability of the left front space is up to 0.17, but it is not the maximum posterior probability among the three free spaces, so the robot executes "Turn Right" command corresponding to the front right space having the highest posterior probability, to adjust the orientation angle of the robot. After the robot reaches the location point (e), the posterior probability of the front left space is 0.75 and becomes the maximum probability among the three spaces, so the robot determines that the location point (e) is the best timing to turn left, and executes the "Turn Left" speech command inputted by the user.

In the corridor, the posterior probability of the front left space is lower because of the wall at the left side, so that the robot executes the "Go Forward" instruction after executing the "Turn Left" speech command to turn to the predetermined orientation angle. In FIG. 6, there are two obstacles located in the corridor, for example, the chair and flower pot are placed in the corridor. In order to prevent the robot from colliding with the obstacles, the robot performs the auto-dodge scheme to modify the movement trace thereof to dodge the obstacle. For example, at the location point (f), the front obstacle causes the posterior probability of the front space continuously drops to be lower than 0.42, which is the posterior probability of front right space; for this reason, the robot executes the "Turn Right" command corresponding to the front right space, and perform obstacle dodge function according to the weight distribution of the auto-dodge function. The weight of the auto-dodge function is 0.58 and the weight of speech command is 0.42, so the robot executes the auto-dodge instruction based on the 58% of weight, so as to prevent the robot from colliding with the obstacle during turn right process.

After the robot bypasses the first obstacle, the variation of the orientation angle of the robot turning right must be compensated. For this reason, when the robot reaches the location point (g) and there is a larger free space in the left side of the robot at the location point (g), the posterior probability of the front left space is increased to 0.72 and becomes the maximum among the three free spaces, so that the robot executes the "Turn Left" instruction to compensate the variation of the orientation angle until the orientation angle of the robot is equal to the orientation angle at the location point (d) where the user inputs the "Turn Left" speech command, and the intention of "Turn Left" speech command is cleared, and the robot is returned to the condition that the robot determines the free space probability according to the environment only. After the orientation angle compensation is completed, the robot determines the free space probability is the posterior probability of the front space, which is 0.66, according to the obstacle in the environment, and the robot is controlled by the "Go Forward" speech command corresponding to the front space having the maximum posterior probability. At the same time, the weight of the auto-dodge function is 0.34, that is, the robot can perform 34% of dodge function to avoid from colliding with the obstacle when the robot execute the optimal instruction, for example, the robot can change the turning angle thereof to safely dodge the second obstacle in the corridor.

When the robot reaches the location point (h), the user can view a door plate or a mark (such as a poster on the wall) in the corridor through the real-time image, and know that the robot is moved close to a door of the left door. The user can input the "Turn Left" speech command. As shown in FIG. 7, the posterior probability of the front left is increased to 0.25, and the posterior probability of the front space is decreased to 0.27, and the posterior probability of the front right space is 0.48 and selected as the free space probability of the robot. As a result, the robot executes the "Turn Right" instruction corresponding to the front right space and starts to turn right to adjust the orientation angle. After the posterior probability of the front space is increased, the robot executes the "Go forward" instruction. When the robot reaches the location point (i), the posterior probability of the front left space is 0.57 and becomes the maximum among the three spaces, so that the robot starts to execute the "Turn Left" speech command inputted by the user. Finally, the robot enters the left room and reach the location point (j), the user speaks "Stop" speech command to stop the robot, and the posterior probabilities of the three spaces in the three directions returns to the state without consideration of the user's intention.

By using aforementioned robot speech control manner, the user just inputs three kinds of speech command to control the robot to move to a target location after the robot is activated. When using the conventional speech control manner, the user must input at least 14 speech commands to control the robot to move to the target location, and the excessive commands increases the user's burden in operation. Furthermore, the delay time of speech recognition and instruction transmission may be about 1 second, if the robot still execute previous instruction in the delay time, the robot may be unable to modify the movement path thereof, so the robot may collide with the obstacle and be damaged.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A robot speech control system, comprising:
   a robot body comprising a movement device, wherein the movement device comprises a plurality of turning wheels configured to control the robot body to turn or move;
   a handheld device comprising a display interface and a speech input interface, and the speech input interface configured to input a speech command which is then converted, by a speech recognition program, into a speech control instruction;
   a command receiver disposed in the robot body and electrically connected to the handheld device through a wireless transmission manner, to receive the speech control command;
   an ambient sensor disposed on the robot body and configured to detect information associated with environment around the robot body, wherein an auto-dodge program converts the information into an auto-dodge instruction;
   a processor electrically connected to the command receiver and the ambient sensor, and configured to receive the speech control instruction and the information associated with the environment, and use Bayesian regression algorithm to calculate a free space probability, so as to let the free space probability serve as a weight $P_f$ of speech command and obtain a weight $P_c$, of a dodge command by $P_c=1-P_f$, wherein the processor integrates the speech control instruction $U_h$ and the weight $P_f$ of the speech command, and the auto-dodge instruction $U_c$ and the weight $P_c$ of the dodge command by $U_s=P_f \times U_h+P_c \times U_c$, to generate a movement control instruction $U_s$; and
   a controller electrically connected to the processor and the movement device, and receive the movement control instruction to drive the movement device.

2. The robot speech control system according to claim 1, wherein the handheld device comprises a smartphone, a tablet computer or a notebook computer, and the wireless transmission manner comprises a manner of using Wi-Fi or wireless communication network.

3. The robot speech control system according to claim 1, wherein the ambient sensor comprises a laser scanner configured to measure a distance between the robot body and an obstacle.

4. The robot speech control system according to claim 1, wherein the ambient sensor is configured to divide the information associated with the environment into a plurality of moving spaces, and the plurality of moving spaces are served as prior probabilities to obtain posterior probabilities of the plurality of moving spaces based on Bayesian regression algorithm, and a maximum of the plurality of posterior probabilities is selected as the free space probability.

5. The robot speech control system according to claim 4, wherein the plurality of moving spaces comprises a left front space, a front space and a right front space, and the left front space is in a range of angle from a left horizontal line of the robot body to 75 degrees forward, the front space is in a range of angle from 15 degrees left to 15 degrees right, and the right front space is in a range of angle from a right horizontal line of the robot body to 75 degrees forward.

6. The robot speech control system according to claim 1, further comprising a comparator electrically connected to the processor and configured to compare whether the speech control instruction is equal to a free space instruction corresponding to the free space probability, and the comparator outputs the speech control instruction as an output instruction when the speech control instruction is equal to the free space instruction, and the comparator outputs the free space instruction as the output instruction when the speech control instruction is not equal to the free space instruction.

7. The robot speech control system according to claim 1, further comprising a camera disposed on the robot body and configured to capture a vision image, and a self-positioning mark of the robot body is displayed on an environment map, and the vision image is transmitted to the handheld device through the wireless transmission manner, for display on the display interface.

8. A robot speech control method, configured to control a robot body to move or turn, and the robot body comprising a command receiver, an ambient sensor, a processor, a controller and a movement device, and the robot speech control method comprising:
   inputting, through a speech input interface of a handheld device, a speech command, and using a speech recognition program to convert the speech command into a speech control instruction;
   transmitting the speech control instruction to a command receiver through a wireless transmission manner;
   using an ambient sensor to detect information associated with environment around the robot body, and using an auto-dodge program to convert the information into an auto-dodge instruction;
   using the processor to receive the speech control instruction and the information associated with environment, and using Bayesian regression algorithm to calculate a free space probability, so as to let the free space probability serve as a weight $P_f$ of speech command and obtain a weight $P_c$ of dodge command by $P_c=1-P_f$;
   using the processor to integrate the speech control instruction $U_h$, the weight $P_f$ of speech command, the auto-dodge instruction $U_c$ and the weight $P_c$ of dodge command by $U_s=P_f \times U_h+P_c \times U_c$, to obtain a movement control instruction $U_s$; and transmitting the movement control instruction to the controller, and using the controller to drive the movement device to turn or move the robot body.

9. The robot speech control method according to claim 8, wherein the handheld device comprises a smartphone, a tablet computer or a notebook computer, and the wireless transmission manner comprises a manner of using Wi-Fi or wireless communication network.

10. The robot speech control method according to claim 8, wherein the ambient sensor uses a laser scanner to measure a distance between the robot body and an obstacle.

11. The robot speech control method according to claim 8, wherein the ambient sensor is configured to divide the information associated with the environment into a plurality of moving spaces, and the plurality of moving spaces are served as prior probabilities to obtain posterior probabilities of the plurality of moving spaces based on Bayesian regression algorithm, and a maximum of the plurality of posterior probabilities is selected as the free space probability.

12. The robot speech control method according to claim 11, wherein the plurality of moving spaces comprises a left front space, a front space and a right front space, and the left front space is in a range of angle from a left horizontal line of the robot body to 75 degrees forward, the front space is in a range of angle from 15 degrees left to 15 degrees right in front of the robot body, and the right front space is in a range of angle from a right horizontal line of the robot body to 75 degrees forward.

13. The robot speech control method according to claim 8, further comprising a step of using a comparator to compare whether the speech control instruction is equal to a free space instruction corresponding to the free space probability, wherein the comparator outputs the speech control instruction as an output instruction when the speech control instruction is equal to the free space instruction, and the comparator outputs the free space instruction as the output instruction when the speech control instruction is not equal to the free space instruction.

14. The robot speech control method according to claim 8, further comprising a step of using a camera to capture a vision image, and displaying a self-positioning mark of the robot body on an environment map, and transmitting the vision image to the handheld device through the wireless transmission manner, for display on the display interface.

\* \* \* \* \*